US010838607B2

(12) United States Patent
Lin et al.

(10) Patent No.: US 10,838,607 B2
(45) Date of Patent: Nov. 17, 2020

(54) MANAGING OBJECTS IN PANORAMA DISPLAY TO NAVIGATE SPREADSHEET

(71) Applicant: MICROSOFT TECHNOLOGY LICENSING, LLC, Redmond, WA (US)

(72) Inventors: Amy Lin, Bothell, WA (US); Melissa MacBeth, Seattle, WA (US); Daniel Battagin, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 500 days.

(21) Appl. No.: 14/851,874

(22) Filed: Sep. 11, 2015

(65) Prior Publication Data

US 2016/0062585 A1 Mar. 3, 2016

Related U.S. Application Data

(63) Continuation of application No. 13/490,830, filed on Jun. 7, 2012, now Pat. No. 9,164,972.

(51) Int. Cl.
*G06F 3/0485* (2013.01)
*G06F 40/18* (2020.01)
(Continued)

(52) U.S. Cl.
CPC .......... *G06F 3/0485* (2013.01); *G06F 3/017* (2013.01); *G06F 3/0482* (2013.01);
(Continued)

(58) Field of Classification Search
CPC .................................................. G06F 17/24
(Continued)

(56) References Cited

U.S. PATENT DOCUMENTS 5,847,706 A * 12/1998 Kingsley ............... G06F 3/0481
715/788
7,184,032 B2 * 2/2007 Stohrer .............. G03G 15/5016
178/18.11
(Continued)

FOREIGN PATENT DOCUMENTS

| CN | 1790244 A | 6/2006 |
| DE | 19939065 A1 | 2/2001 |
| WO | WO-2007018377 A1 * | 2/2007 ......... H04N 5/44591 |

OTHER PUBLICATIONS

"First Office Action and Search Report Issued in Chinese Patent Application No. 201380030143.0", dated Apr. 28, 2016, 22 Pages.
(Continued)

*Primary Examiner* — Mandrita Brahmachari
(74) *Attorney, Agent, or Firm* — Newport IP, LLC; Benjamin A. Keim

(57) ABSTRACT

A panorama display application shows objects from a spreadsheet such as charts in primary screen of a mobile device adjoined by left and right virtual screens. The application overlays interaction controls such as sort and filter functions on the object. The application also provides additional interaction controls for the object on the left virtual screen and associated objects links on the right virtual screen. The application may expose the additional interaction controls and the associated objects links by overlaying portions of the virtual screens on the primary screen. The application fluidly shifts content from virtual screens to the primary screen subsequent to detected user action on the overlaid portions.

20 Claims, 8 Drawing Sheets

(51) Int. Cl.

| | | |
|---|---|---|
| *G06F 40/166* | (2020.01) | |
| *G06F 3/01* | (2006.01) | |
| *G06F 3/0482* | (2013.01) | |
| *G06F 3/0488* | (2013.01) | |
| *G06T 3/00* | (2006.01) | |

(52) U.S. Cl.
CPC .......... *G06F 3/0488* (2013.01); *G06F 40/166* (2020.01); *G06F 40/18* (2020.01); *G06T 3/0006* (2013.01)

(58) Field of Classification Search
USPC ........................................................ 715/212
See application file for complete search history.

(56) References Cited

U.S. PATENT DOCUMENTS

| | | | |
|---|---|---|---|
| 7,199,406 B2 | 4/2007 | Kim et al. | |
| 7,299,406 B2* | 11/2007 | Schnurr | ................ H04W 24/00 715/212 |
| 7,337,180 B2 | 2/2008 | Spriestersbach | |
| 7,548,925 B2* | 6/2009 | Bradlee | ............. G06F 17/30395 |
| 7,617,444 B2 | 11/2009 | Rothschillwe et al. | |
| 8,108,791 B2* | 1/2012 | Wang | ..................... G06F 3/0485 715/206 |
| 8,209,623 B2* | 6/2012 | Barletta | ............... G06F 3/04883 715/776 |
| 8,994,721 B2* | 3/2015 | Matsuda | ............. G06F 3/04815 345/419 |
| 2005/0273695 A1 | 12/2005 | Schnurr | |
| 2006/0036964 A1 | 2/2006 | Satterfield et al. | |
| 2006/0212827 A1 | 9/2006 | Lee | |
| 2008/0180408 A1 | 7/2008 | Forstall et al. | |
| 2009/0228820 A1 | 9/2009 | Kim et al. | |
| 2009/0300548 A1* | 12/2009 | Sullivan | ................ G06F 3/0482 715/830 |
| 2009/0313537 A1 | 12/2009 | Fu et al. | |
| 2010/0223574 A1 | 9/2010 | Wang et al. | |
| 2010/0309148 A1 | 12/2010 | Fleizach et al. | |
| 2011/0099524 A1* | 4/2011 | Jeong | .................... G06F 3/0486 715/843 |
| 2011/0161849 A1* | 6/2011 | Stallings | ............... G06F 3/0488 715/768 |
| 2011/0254915 A1 | 10/2011 | Vincent et al. | |
| 2012/0079429 A1* | 3/2012 | Stathacopoulos | .. H04N 21/4826 715/830 |

OTHER PUBLICATIONS

"Second Office Action Issued in Chinese Patent Application No. 201380030143.0", dated Dec. 15, 2016, 14 Pages.

"International Search Report and Written Opinion Issued in PCT Application No. PCT/US2013/042793", dated Jul. 18, 2013, 10 Pages.

"International Preliminary Report on Patentability Issued in PCT Application No. PCT/US2013/042793", dated Dec. 18, 2014, 7 Pages.

"Excel 2003 Charting User Interface Screenshot", Retrieved on: Jan. 1, 2003, Available at: file:///C:/Documents%20and%20Settings/xxx/Desktop/Document1.pdf.

Johnson, Jeff A., "A Comparison of User Interfaces for Panning on a Touch-Controlled Display", In Proceedings of the SIGCHI Conference on Human Factors in Computing Systems, May 7, 1995, pp. 218-225.

Alsbury, Quinton, "What Makers of Business Apps can Learn from Angry Birds", Published on: Jan. 5, 2012, Available at: www.cnet.com/news/what-makers-of-business-apps-can-learn-from-angry-birds/.

"Non-Final Office Action Issued in U.S. Appl. No. 13/490,830", dated Nov. 17, 2014, 22 Pages.

"Final Office Action Issued in U.S. Appl. No. 13/490,830", dated Apr. 23, 2015, 15 Pages.

"Notice of Allowance Issued in U.S. Appl. No. 13/490,830", dated Jun. 24, 2015, 11 Pages.

"Office Action issued in European Patent Application No. 13730691.6", dated Dec. 6, 2018, 9 Pages.

* cited by examiner

MANAGING OBJECTS IN PANORAMA DISPLAY TO NAVIGATE SPREADSHEET

CROSS-REFERENCE TO RELATED APPLICATION

This Application is a continuation under 35 U.S.C. § 120 of co-pending U.S. patent application Ser. No. 13/490,830 filed on Jun. 7, 2012. The disclosure of the U.S. Patent Application is hereby incorporated by reference in its entirety.

BACKGROUND

Computer applications interact with human beings through user interfaces. While audio, tactile, and similar forms of user interfaces are available, visual user interfaces through a display device are the most common form of user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications render visual effects through a display and enable users to provide input associated with the applications' operations.

Screen size and utilization are ongoing concerns in mobile device platforms. Screen sizes in mobile devices are limited due to minimalist approach most modern solutions provide to fulfill customer demand. There is substantial technical challenge to providing a display capable of desktop computer resolutions in a mobile device. Even when feasible, providing a desktop computer resolution in a mobile device leads to tiny fonts and diminished usability. Duplicating most features of a desktop application including controls and fine details of a displayed object is a great challenge to surmount. Most modern solutions provide mobile applications with diminished features compared to desktop counterparts. Other solutions try to fit large desktop based menu structures into smaller screen size of mobile devices with diminished returns on usability.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to managing objects in a panorama display to navigate a spreadsheet. According to embodiments, an application may display an object from the spreadsheet on a primary screen of a panorama display including the primary screen and left and right virtual screens. The primary screen may be a display surface of a mobile device. The application may overlay primary interaction controls on the object. Primary interaction controls may include controls to manipulate elements of the object. The application may provide additional interaction controls for the object on the left virtual screen adjacent to the primary screen and/or associated objects links on the right virtual screen adjacent to the primary screen.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
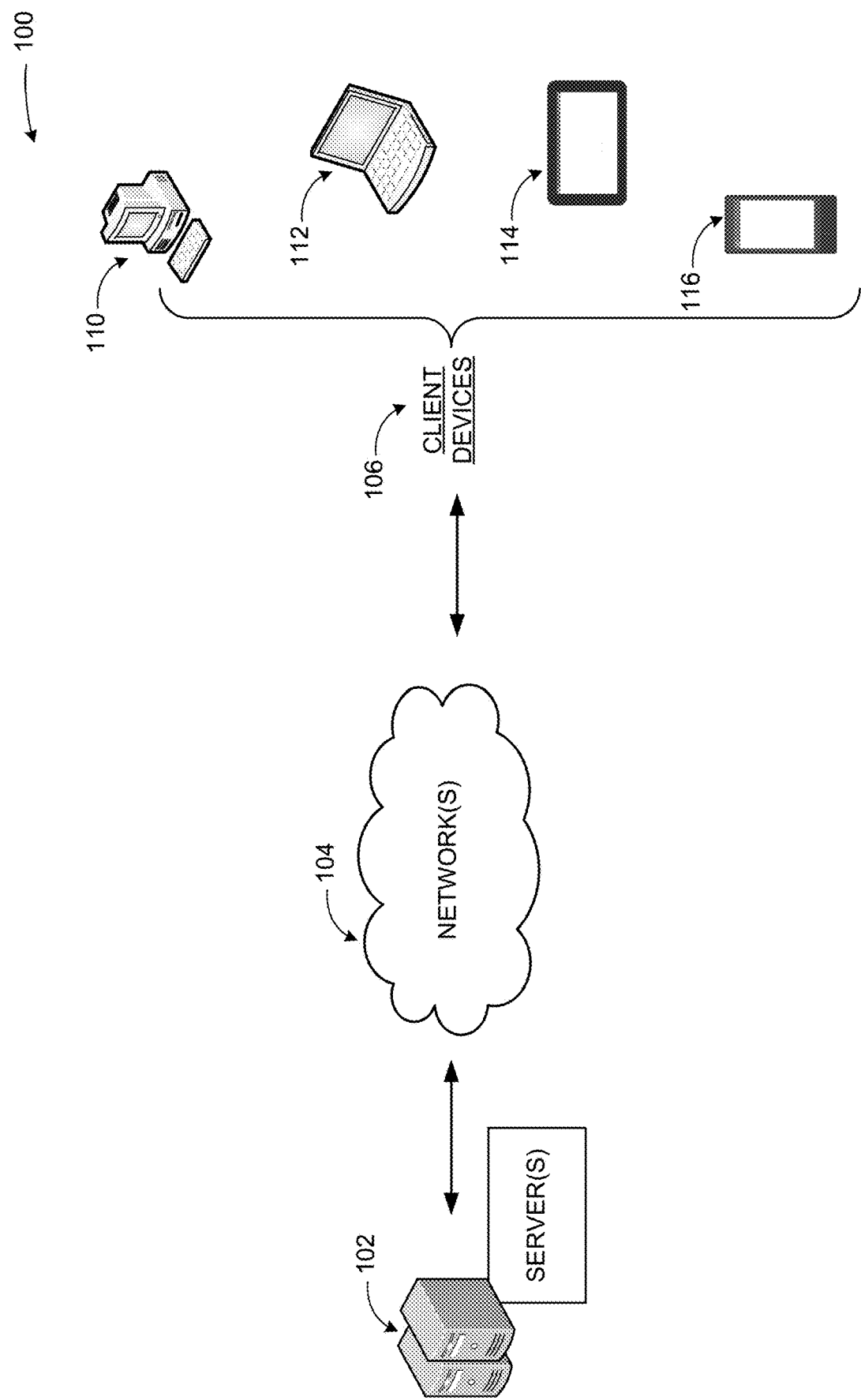
FIG. 1 illustrates an example network diagram where an application may manage objects in a panorama display to navigate a spreadsheet according to some embodiments.

As briefly described above, an application may manage objects in a panorama display to navigate a spreadsheet. The application may display an object such as a chart on a primary screen of a panorama display with adjoining virtual screens. The primary screen may be the display surface of a mobile device such as a smart phone of a tablet device (i.e.: a slate.) The display surface may be a touch based control surface for the device. The device may also be controlled by gestures, which may be captures optically or based on touch. The application may overlay primary interaction controls on the object. The primary interaction controls may be dynamically changed as a result of zooming in and out of sections of the object. The application may also provide additional interaction controls for the object on a left virtual screen and associated objects links on a right virtual screen adjacent to the primary screen. The additional interaction controls may include data element manipulation processes such as sorting and filtering. The associated objects links may include links to pivot tables and alternative charts of the object. Next, the application may overlay portions of the left and right virtual screens on the primary screen exposing the additional interaction controls and the associated objects links on the primary screen.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a non-transitory computer-readable memory device. The computer-readable storage medium can for example be implemented via one or more of a volatile computer memory, a non-volatile memory, a hard drive, a flash drive, a floppy disk, or a compact disk, and comparable media.

According to embodiments, a spreadsheet may be any data in a table format which may include objects such as charts to represent the data. A panorama display may include a primary screen and multiple virtual screens with content. A user may be enabled to shift content from one virtual screen to the primary screen through touch actions. Touch actions may include taps and swipes. The panorama display may provide a continuous display experience through fluid shift movements when changing content from virtual screens to the primary screen. The primary screen may be the display surface of a mobile device such as a smart phone, a tablet or slate device, or any device with a touch based display. Due to screen size limitations in mobile devices, a spreadsheet may be partitioned to object, additional object controls, and associated objects links to be managed by the panorama display.

Throughout this specification, the term "platform" may be a combination of software and hardware components for managing objects in a panorama display to navigate a spreadsheet. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 illustrates an example network diagram where an application may manage objects in a panorama display to navigate a spreadsheet according to some embodiments. The components and environments shown in diagram 100 are for illustration purposes. Embodiments may be implemented in various local, networked, cloud-based and similar computing environments employing a variety of computing devices and systems, hardware and software.

In an example environment illustrated in diagram 100, one or more servers 102 may provide content such as a spreadsheet for consumption. Content may be stored in data stores partitioned to data tables. The servers 102 may provide the content to clients upon request through networks 104. The network(s) 104 may be any network architecture providing access to the servers 102 through wired or wireless technology.

Client devices 106 may include a variety of hardware such as desktop computer 110, laptop computer 112, a tablet device 114 such as a slate, and a smart phone 116. The client devices 106 may execute an application providing a panorama display through the client devices display surface. The client devices 106 may retrieve content such as a spreadsheet from servers 102. An application executing on client devices 106 may display an object, controls, and associated objects retrieved from the content in the panorama display of the client devices 106. Alternatively, the client devices may retrieve and display object, controls, and associated objects links on the panorama display of the client devices from local content (i.e.: a spreadsheet) of the client devices.

Figure 2:
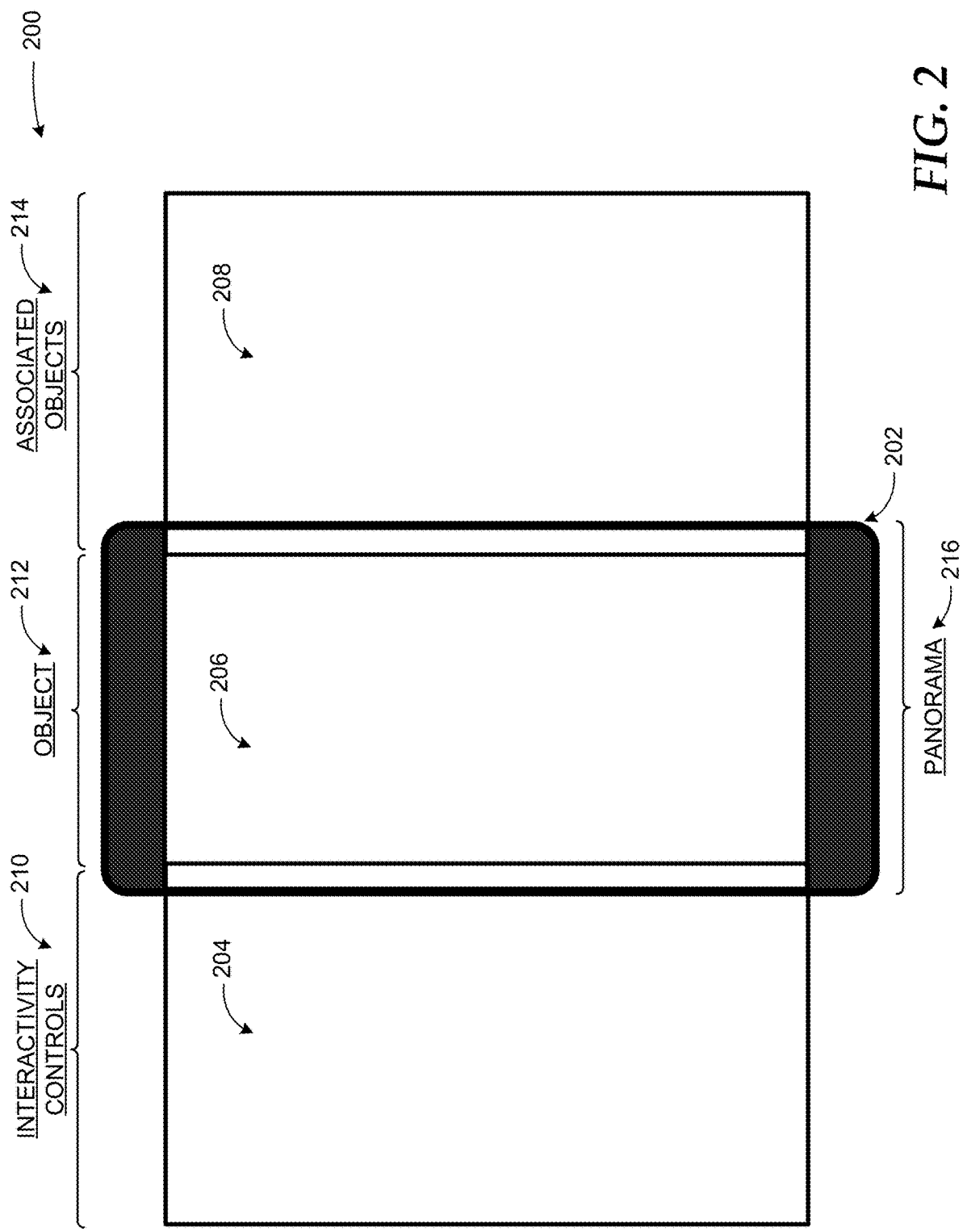
FIG. 2 illustrates an example user interface managing objects in a panorama display to navigate a spreadsheet according to embodiments.

FIG. 2 illustrates an example user interface managing objects in a panorama display to navigate a spreadsheet according to embodiments. Diagram 200 displays an example mobile device 202 such as a smart phone executing an application utilizing the panorama display.

According to some embodiments, the device 202 may have a display capable of showing the panorama display 216. The panorama display 216 may expose virtual screens adjacent to a primary screen 206 through overlaid portions on the primary screen 206. A left virtual screen 204 and a right virtual screen 208 may be partially overlaid on the primary screen 206 exposing a user to additional content such controls and objects links.

According to other embodiments, the left virtual screen 204 may provide additional interaction controls 210 for an object 212 displayed on the primary screen 206. The application may provide primary controls to manipulate the object 212 displayed on the primary screen 206. The additional interaction controls may include functionality to alter the data elements of the object 212. In an example scenario, the application may overlay primary interaction controls on the object 212 to sort and filter data elements through primary screen 206. In another example scenario, the application may provide additional interaction controls 210 such as expanded sort and filter functions provided on the left virtual screen.

According to other embodiments, the application may provide associated objects links 214 on a right virtual screen 208. In an example scenario where the object 212 is a chart, the associated objects links may include links to data tables, alternative charts, pivot tables, etc.

Figure 3:
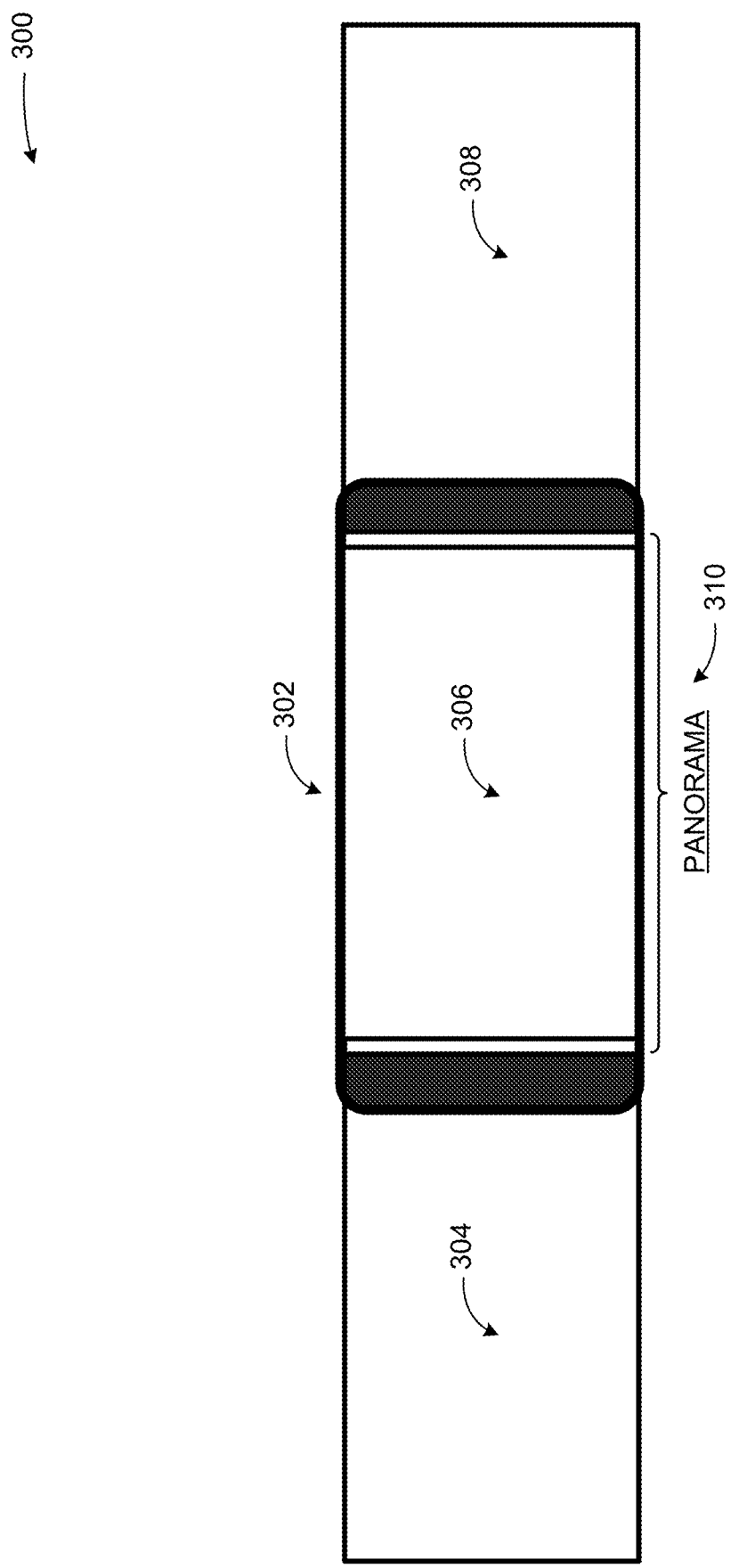
FIG. 3 illustrates another orientation of an example user interface managing objects in a panorama display to navigate a spreadsheet according to embodiments.

FIG. 3 illustrates another orientation of an example user interface managing objects in a panorama display to navigate a spreadsheet according to embodiments. Diagram 300 displays a device 302 such as a smart phone in a horizontal orientation. An application providing a panorama display 310 may adjust the panorama display 310 according to the orientation of the device 302.

According to some embodiments, the application may detect a change in orientation of the device through device sensors. According to the orientation of the device, the application may adjust the orientation of the panorama display 310. When the application detects the device 302 in a horizontal orientation, the application may rotate the object displayed on a primary screen 306 to a horizontal format. The application may rescale the object to fit the horizontal format. Examples may include swapping axis in charts and adding and removing columns and rows from data tables, etc.

According to other embodiments, the application may also rotate virtual screens adjacent to the primary screen upon detecting a rotated device 302. In an horizontal position, the application may rotate left virtual screen 304 to a horizontal position and rescale provided content such as additional interaction controls to a horizontal orientation. The rescaled controls may be formatted to be displayed in two columns to utilize the horizontal screen space in an optimized fashion. Additionally, the application may also re-orient the contents of a right virtual screen 308 to a horizontal orientation upon detecting a horizontal device 302. The application may rescale the contents such as associated objects links. The application may format the associated objects links to utilize the horizontal screen space optimally. Examples may include presenting the links through multiple columns or displaying additional information about the associated objects. Embodiments are not limited to horizontal orientation described above, the device may also be held in a vertical orientation leading the application to re-orient the right and left virtual screens and the primary screen to a vertical orientation as described in prior examples.

Figure 4:
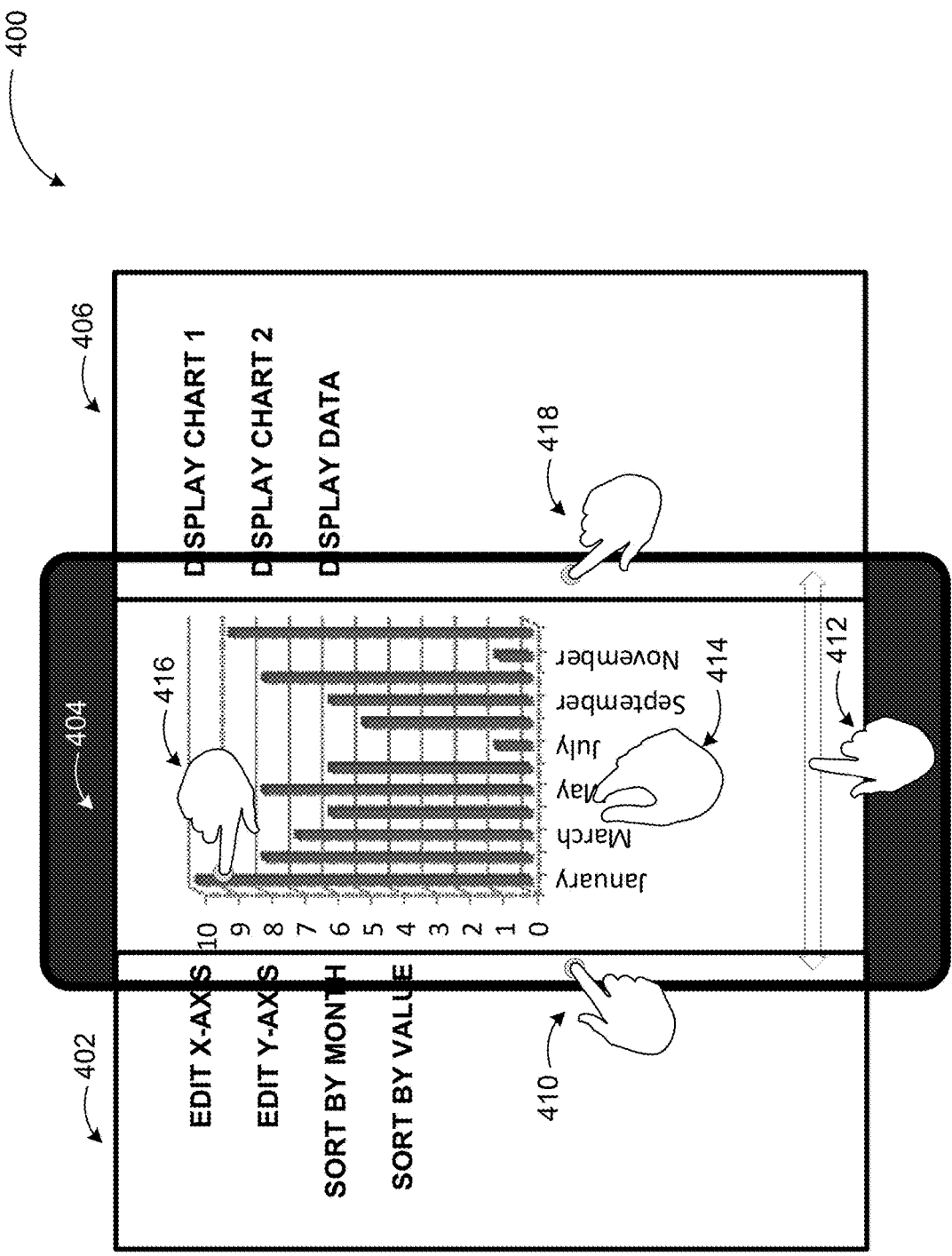
FIG. 4 illustrates another example user interface displaying actions to manage objects in a panorama display to navigate a spreadsheet according to embodiments.

FIG. 4 illustrates another example user interface displaying actions to manage objects in a panorama display to navigate a spreadsheet according to embodiments. Diagram 400 may display a left virtual screen 402, a primary screen 404, and a right virtual screen 406. The left virtual screen 402 may provide additional interaction controls. The right virtual screen 406 may provide associated links objects. The primary screen 404 may display the object and overlaid portions of the left and right virtual screens.

According to some embodiments, a user may touch a portion of the left virtual screen 402 overlaid on the primary screen 404. The touch action may be a tap 410. Upon detecting the tap 410, the application may shift the contents of the left virtual screen 402 such as the additional interaction controls into the primary screen 404. The application may provide the object displayed by the primary screen 404 on the right virtual screen 406. The application may also provide the associated objects links on the left virtual screen 402. Alternatively, the application may initiate a right shift of the additional interaction controls when the application detects a touch action such as a right swipe 412 concluding on a right edge of the primary screen 404 overlaid by the portion of the right virtual screen. A right swipe is not limited to one concluding on the right edge. Any predefined right swipe on the primary screen may initiate right shift of content within the panorama display.

According to other embodiments, the user may touch a portion of the right virtual screen 406 overlaid on the primary screen 404. The touch action may be a tap 418. Upon detecting the tap 418, the application may shift the contents of the right virtual screen 406 such as associated objects links into the primary screen 404. The application may provide the object displayed by the primary screen 404 into the left virtual screen 402. The application may also provide the additional interaction controls on the right virtual screen 406. Alternatively, the application may initiate a left shift of the associated objects links when the application detects a touch action such as a left swipe 412 concluding on a left edge of the primary screen 404 overlaid by the portion of the left virtual screen. A left swipe is not limited to one concluding on the left edge. Any predefined left swipe on the primary screen may initiate left shift of content within the panorama display.

According to yet other embodiments, the application may overlay primary controls on the content displayed on the primary screen 404. In an example scenario, the application may detect a touch action such as a tap 416 on an element of the object. The application may display a pop-up information box providing additional information about the element. In another example scenario, the application may detect a touch action such as a pinch 414 or a spread. The application may zoom into a section of the object centered around the pinch 414 subsequent to detecting the pinch 414. Alternatively, the application may zoom out of a section of the object centered around a spread subsequent to detecting the spread.

According to other embodiments, the application may detect a touch action on the object. The application may activate a primary interaction control associated with the touch action. The primary interaction control may include a select, a sort, a filter, a zoom in, or a zoom out of data elements of the object. The touch action may include a tap, a tap and hold, a swipe, a pinch, and a spread. Alternatively, the touch action may include multiple fingertips based motions which may be previously or dynamically assigned to controls for the object.

According to other embodiments, the application may position the overlaid portion of the left virtual screen at a left edge of the primary screen. The application may also position the overlaid portion of the right virtual screen at a right edge of the primary screen. Additionally, the application may rotate the object, the additional interaction controls, and the associated objects links according to a horizontal and a vertical positioning of the panorama display as discussed above.

According to other embodiments, the application may detect a right swipe concluding at a right edge of the primary screen or a tap on an area of the primary screen displaying the overlaid portion of the left virtual screen as a touch action. The application may shift the additional interaction controls to the primary screen subsequent to detecting the touch action. And, the application may provide the object on the right virtual screen. Alternatively, the application may detect a left swipe concluding at a left edge of the primary screen or a tap on an area of the primary screen displaying the overlaid portion of the right virtual screen as a touch action. The application may shift the associated objects links to the primary screen. And, the application may provide the object on the left virtual screen.

According to other embodiments, the object may be a data table or a chart associated with the data table. The additional interaction controls may activate operations on elements and format of the object. As previously discussed, the primary screen may be a display surface of a device such as a mobile device.

Figure 5:
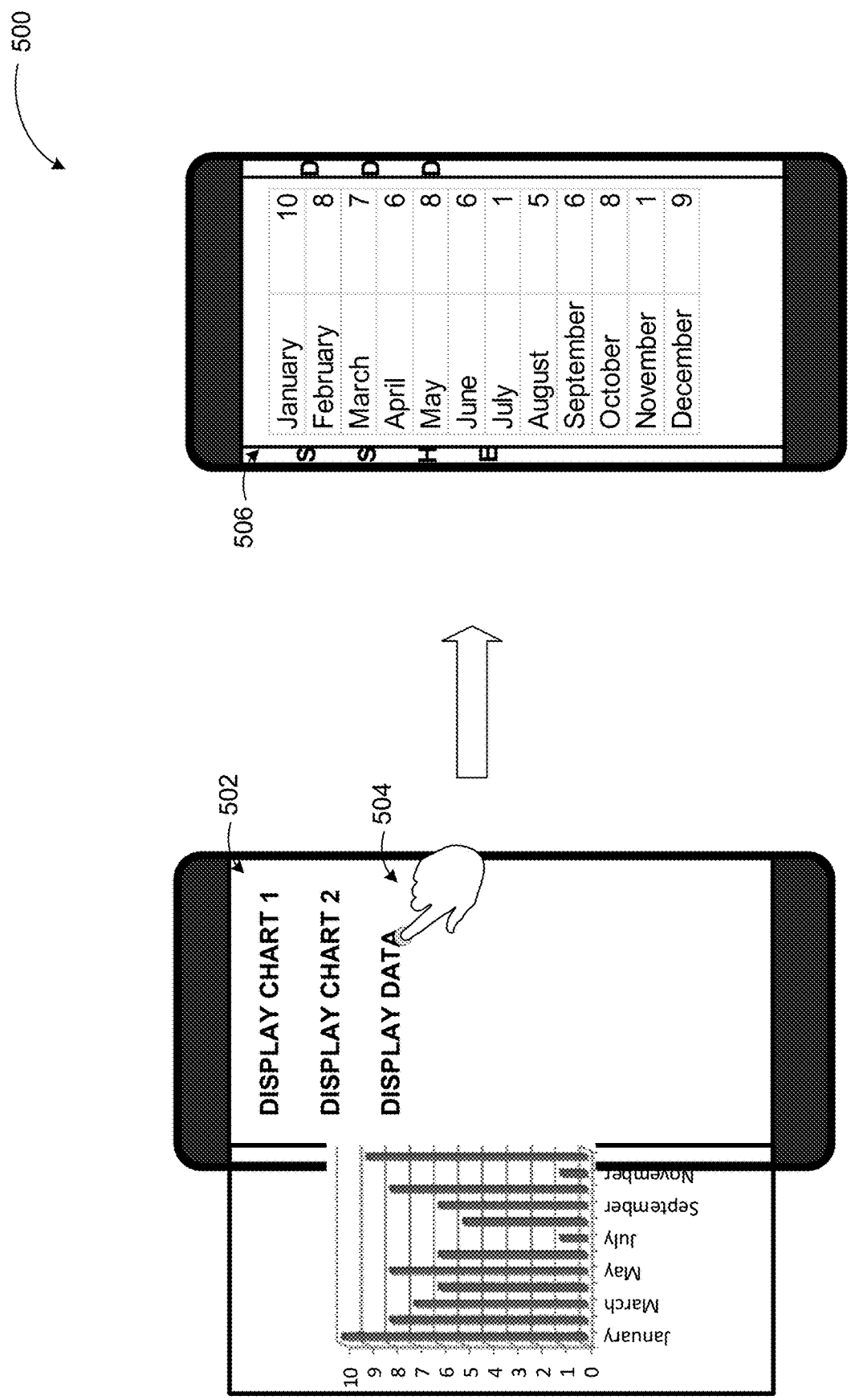
FIG. 5 illustrates another example user interface in transition between screens of a panorama display managing objects to navigate a spreadsheet according to embodiments.

FIG. 5 illustrates another example user interface in transition between screens of a panorama display managing objects to navigate a spreadsheet according to embodiments. Diagram 500 may display a device showing associated objects links on a primary screen 502 and an object such as a chart provided on the left virtual screen. The application may detect a tap action 504 selecting one of the associated objects links. Subsequently, the application may display the selected object such as a data table on the primary screen 506 of the device.

According to some embodiments, the application may provide associated objects links including alternative charts of the object and pivot tables of data elements of the object on a left virtual screen. Additionally, the application may provide additional interaction controls to create pivot tables of data elements of the object including object attribute selection and attribute relationship analysis controls on the right virtual screen.

According to other embodiments, the application may adjust a movement between the object, the additional interaction controls, and the associated objects links to provide a fluid shift according to the detected touch action. Additionally, the application may detect another touch action selecting one of the associated object links. Subsequent to detecting the other touch action, the application may display a selected associated object on the primary screen.

According to yet other embodiments, the application may adjust presented primary interaction controls subsequent to zoom in or zoom out from a section of the object centered around the zoom action according to an associated pinch or spread user touch action. In an example scenario, the application may provide primary controls to manipulate an element subsequent to zoom in to the element. In another example scenario, the application may provide default primary controls to manipulate the entire object subsequent to a zoom out of a section of the object.

Embodiments are not limited to primary screen and left and right virtual screens. In alternate embodiments, multiple virtual screens may be used to provide multiple objects, additional interaction controls sets, or associated objects links sets. Embodiments are also not limited to overlaying the portions of the right and left virtual screen on the primary screen simultaneously. Both or one of the left and right portions may be displayed according to user preferences or dynamically adjusted settings. A user may still access an un-displayed portion of a virtual screen through a user action such as tap or a swipe in the direction of the virtual screen.

The example scenarios and schemas in FIG. 2 through 5 are shown with specific components, data types, and configurations. Embodiments are not limited to systems according to these example configurations. Managing objects in a panorama display to navigate a spreadsheet may be implemented in configurations employing fewer or additional components in applications and user interfaces. Furthermore, the example schema and components shown in FIG. 2 through 5 and their subcomponents may be implemented in a similar manner with other values using the principles described herein.

Figure 6:
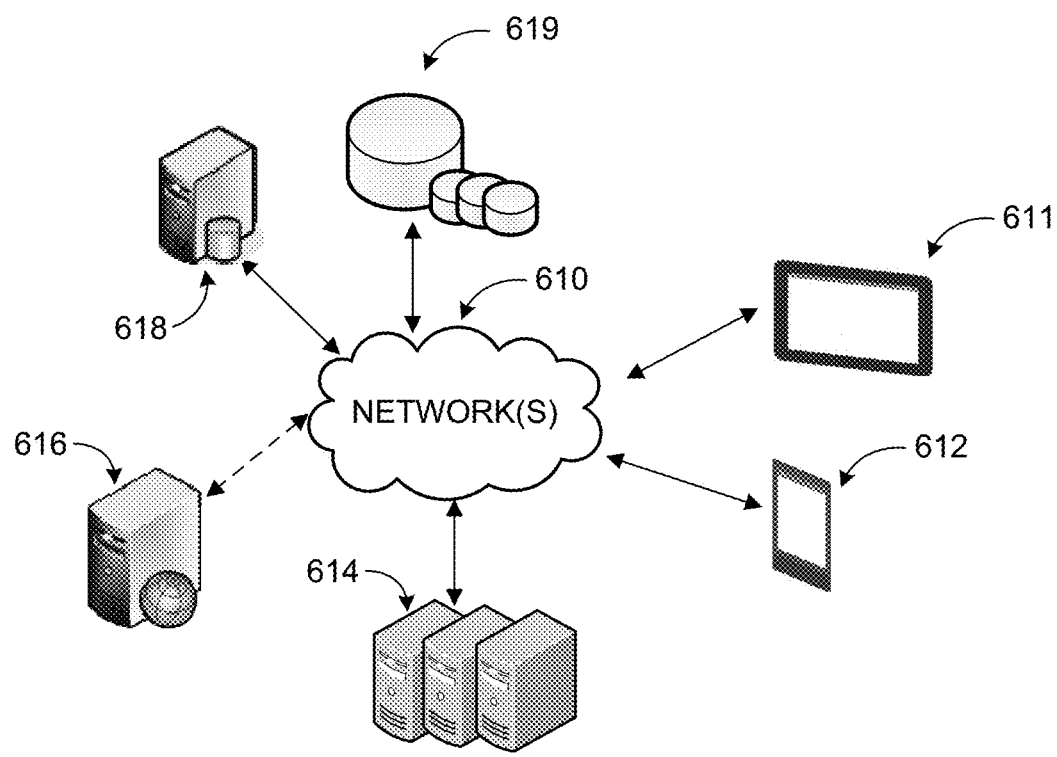
FIG. 6 is a networked environment, where a system according to embodiments may be implemented.

FIG. 6 is a networked environment, where a system according to embodiments may be implemented. Local and remote resources may be provided by one or more servers 614 or a single server (e.g. web server) 616 such as a hosted service. An application may communicate with client interfaces on individual computing devices such as a smart phone 612 or a tablet device 611 ('client devices') through network(s) 610.

As discussed above, an application may manage objects in a panorama display to navigate a spreadsheet. The application may display an object from the spreadsheet on a primary screen of the device and provide additional interaction controls and associated objects links in adjoining virtual screens. The application may orient the primary screen, virtual screen and contents according to detected device orientation to provide optimum flow during content shifts from virtual screens to the primary screen. Client devices 611-613 may enable access to applications executed on remote server(s) (e.g. one of servers 614) as discussed previously. The server(s) may retrieve or store relevant data from/to data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to manage objects in a panorama display to navigate a spreadsheet. Furthermore, the networked environments discussed in FIG. 6 are for illustration purposes only. Embodiments are not limited to the example applications, modules, or processes.

Figure 7:
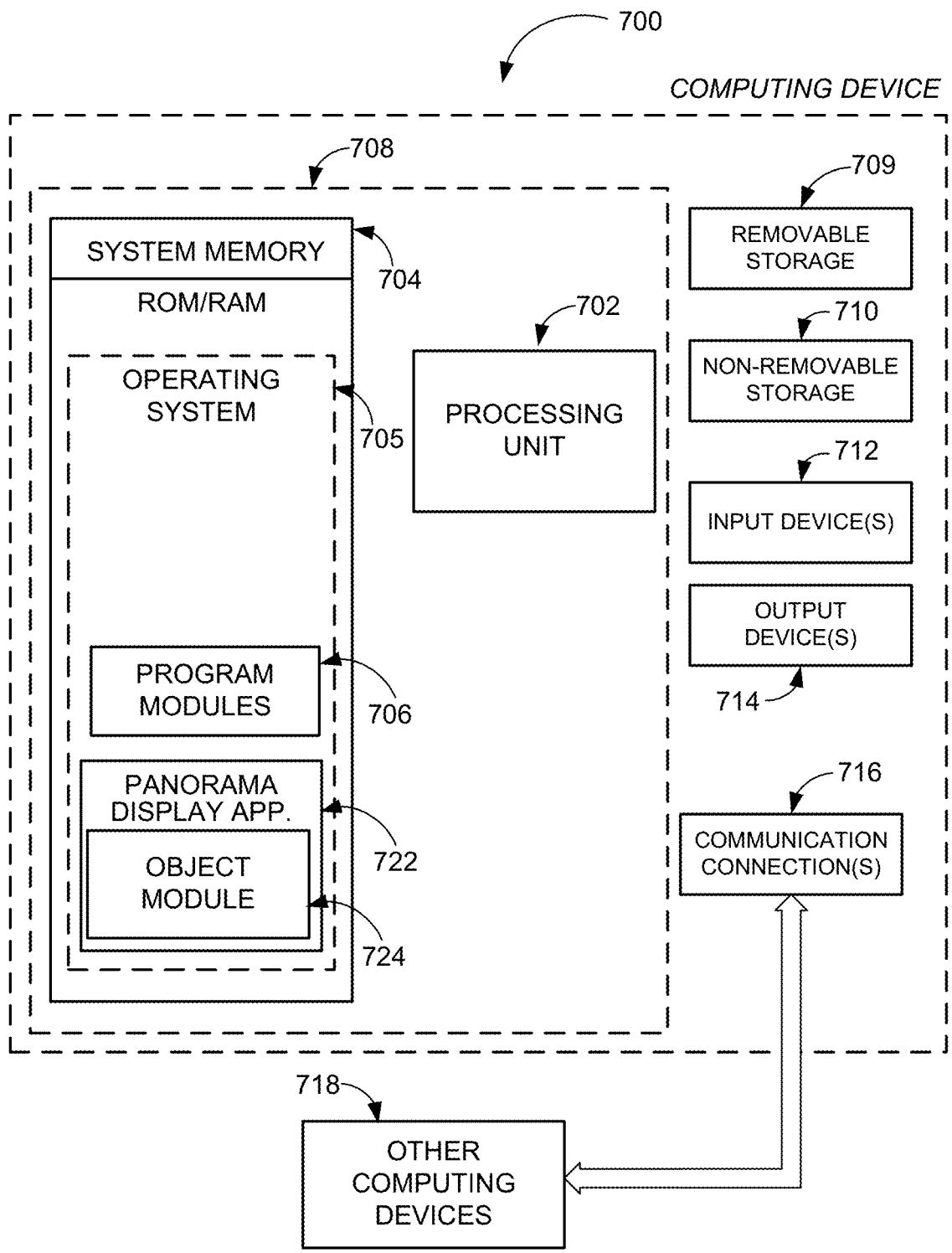
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® and WINDOWS PHONE® operating systems from MICROSOFT CORPORATION of Redmond, Wash. The system memory 704 may also include one or more software applications such as program modules 706, a panorama display application 722, and object module 724.

Panorama display application 722 may provide a display surface of a device with adjoining virtual screens to provide additional interaction controls and associated objects links for the object displayed on the primary screen according to embodiments. The object module 724 may format and evaluate objects to create controls for the objects and associated objects. Examples may include forming pivot tables according to defined relationships between attributes of the objects. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and nonremovable media implemented in any method or technology for storage of information, such as computer readable instructions, data structures, program modules, or other data. Computer readable storage media is a non-transitory computer readable memory device. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, storage servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 8:
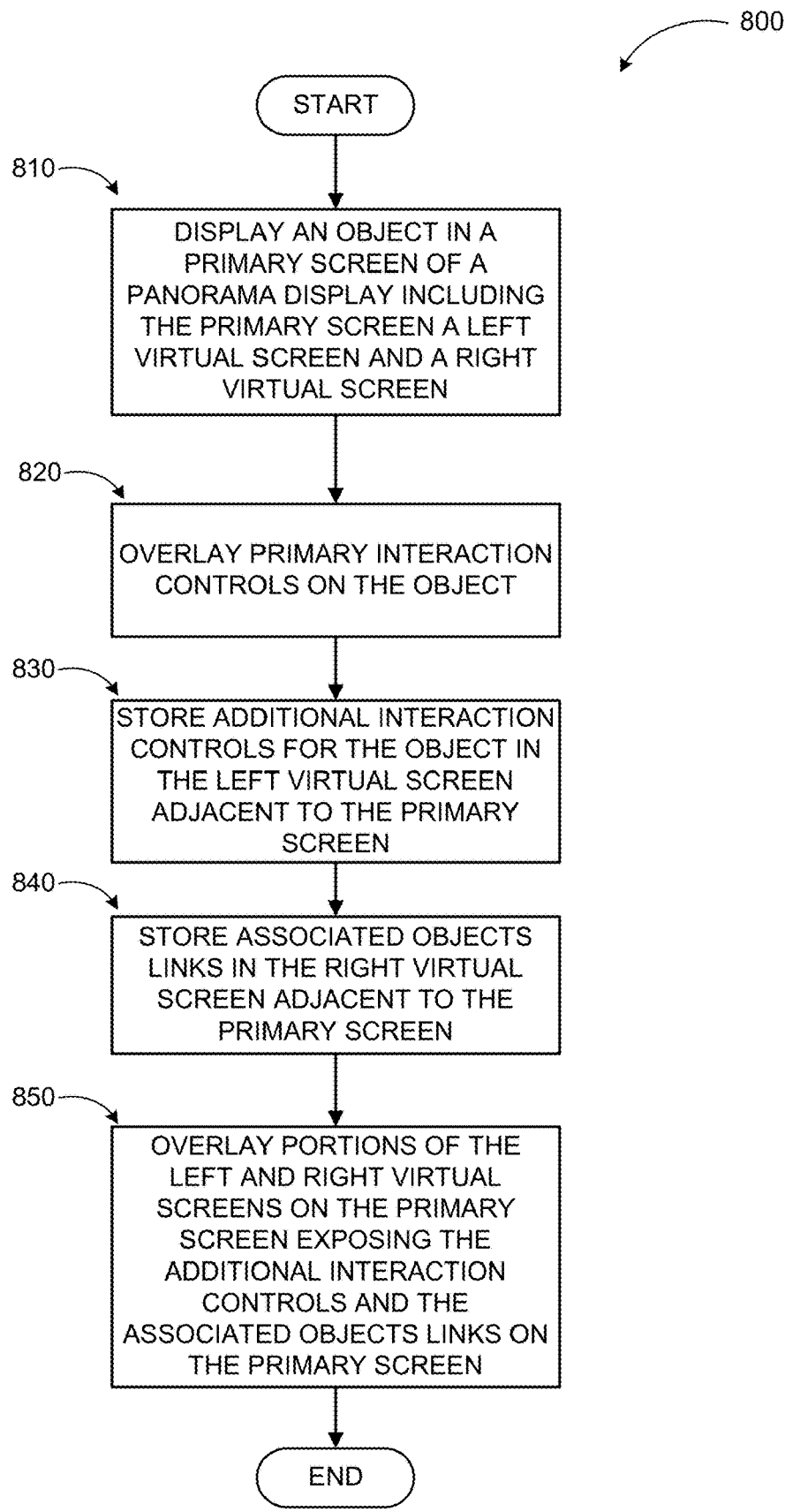
FIG. 8 illustrates a logic flow diagram for a process managing objects in a panorama display to navigate a spreadsheet according to embodiments.

FIG. 8 illustrates a logic flow diagram for a process managing objects in a panorama display to navigate a spreadsheet according to embodiments. Process 800 may be implemented by an application such as a panorama display application in some examples.

Process 800 may begin with operation 810 where an application may display an object from the spreadsheet on a primary screen of a panorama display that includes left and right adjoined virtual screens. At operation 820, the application may overlay primary interaction controls on the object. The primary interaction controls may include sort, filter and zoom functions. Next, the application may provide additional interaction controls for the object on the left virtual screen at operation 830. The additional interaction controls may be determined dynamically according to the object displayed by the primary screen. At operation 840, the application may provide associated objects links on the right virtual screen. The associated objects may include pivot tables, alternative charts, etc. Subsequently, the application may overlay portions of the left and right virtual screens on the primary screen to expose the additional interaction controls and the associated objects links on the primary screen at operation 850.

Some embodiments may be implemented in a computing device that includes a communication module, a memory, and a processor, where the processor executes a method as described above or comparable ones in conjunction with instructions stored in the memory. Other embodiments may be implemented as a computer readable storage medium with instructions stored thereon for executing a method as described above or similar ones.

The operations included in process 800 are for illustration purposes. Managing objects in a panorama display to navigate a spreadsheet according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to manage objects in a display to navigate an application, the computing device comprising:
  a memory configured to store instructions;
  a processor coupled to the memory, the processor executing the instructions stored in the memory; and
  a touch-based display coupled to the processor;
  wherein the instructions cause the computing device to:
    display an object from the application on a primary screen of the display, wherein the display includes the primary screen, a left virtual screen, and a right virtual screen;
    provide, on the left virtual screen, at least one of (i) an interaction control or (ii) a link to other objects;
    provide, on the right virtual screen, at least one of (i) the interaction control or (ii) the link to other objects;
    overlay an actionable portion of the left virtual screen on a left edge of the primary screen, the actionable portion of the left virtual screen having content overlaid on the primary screen, wherein the actionable portion of the left virtual screen exposes a right portion of the left virtual screen with an indication of (i) the interaction control or (ii) the link to other objects available on the left virtual screen;
    overlay an actionable portion of the right virtual screen on a right edge of the primary screen, the actionable portion of the right virtual screen having content overlaid on the primary screen, wherein the actionable portion of the right virtual screen exposes a left portion of the right virtual screen with an indication of (i) the interaction control or (ii) the link to other objects on the right virtual screen;

detect a gesture on one of the actionable portion of the left virtual screen overlaid on the primary screen or the actionable portion of the right virtual screen overlaid on the primary screen;

responsive to detection of the gesture on the actionable portion of the left virtual screen, shift the left virtual screen to the touch-based display in place of the primary screen; and responsive to detection of the gesture on the actionable portion of the right virtual screen, shift the right virtual screen to the touch-based display in place of the primary screen.

2. The computing device of claim 1, wherein the processor is further configured to:

detect a change in an orientation of the primary screen through device sensors integrated with the computing device; and modify the orientation of the primary screen to match the detected orientation change.

3. The computing device of claim 2, wherein the processor is further configured to:

rotate the object displayed on the primary screen to match the detected orientation change of the primary screen, wherein the object is a data table; and re-scale the object displayed on the primary screen by one or more of adding columns to the data table, adding rows to the data table, removing columns from the data table, and removing rows from the data table.

4. The computing device of claim 2, wherein the processor is further configured to:

rotate the object displayed on the primary screen to match the detected orientation change of the primary screen, wherein the object is a chart associated with a data table; and re-scale the object displayed on the primary screen by swapping axes in the chart.

5. The computing device of claim 2, wherein the processor is further configured to:

rotate and re-scale content provided on at least one of the left virtual screen or the right virtual screen to match the detected orientation change of the primary screen.

6. The computing device of claim 1, wherein the processor is further configured to:

detect, on the touch-based display, a touch action on an element of the object from the application; and display one of a drop-down menu or a pop-up box that provides additional information about the element.

7. The computing device of claim 1, wherein the processor is further configured to:

detect, on the touch-based display, touch action on an element of the object from the application;

activate a primary interaction control overlaid on the object from the application displayed on the primary screen, wherein the primary interaction control includes one or more of a select control, a sort control, a filter control, a zoom in control, or a zoom out control; and perform actions associated with the primary interaction control on the element of the object from the application.

8. The computing device of claim 1, wherein the processor is further configured to:

detect an activation of the interaction control; and perform actions associated with the interaction control on a format of the object from the application.

9. The computing device of claim 1, wherein the processor is further configured to:

detect, on the touch-based display, a swipe action concluding at a right edge of the primary screen;

shift (i) the interaction control or (ii) the link to other objects from the left virtual screen to the primary screen; and shift the object from the application into the right virtual screen.

10. The computing device of claim 1, wherein the processor is further configured to:

detect, on the touch-based display, a tap action on an area of the primary screen displaying the right portion of the left virtual screen; and shift (i) the interaction control or (ii) the link to other objects from the left virtual screen to the primary screen.

11. A method comprising:

causing display of an object from a spreadsheet on a primary screen of a display of a computing device, wherein the display includes the primary screen, a left virtual screen, and a right virtual screen;

providing, on the left virtual screen, at least one of (i) an interaction control determined according to the object from the spreadsheet displayed on the primary screen or (ii) a link to other objects associated with the object from the spreadsheet displayed on the primary screen;

providing, on the right virtual screen, at least one of (i) the interaction control determined according to the object from the spreadsheet displayed on the primary screen or (ii) the link to other objects associated with the object from the spreadsheet displayed on the primary screen;

overlaying an actionable portion of the left virtual screen on a left edge of the primary screen, the actionable portion of the left virtual screen having content overlaid on the primary screen, wherein the actionable portion of the left virtual screen exposes a right portion of the left virtual screen with an indication of (i) the interaction control determined according to the object from the spreadsheet displayed on the primary screen or (ii) the link to other objects associated with the object from the spreadsheet displayed on the primary screen available on the left virtual screen;

overlaying an actionable portion of the right virtual screen on a right edge of the primary screen, the actionable portion of the right virtual screen having content overlaid on the primary screen, wherein the actionable portion of the right virtual screen exposes a left portion of the right virtual screen with an indication of (i) the interaction control determined according to the object from the spreadsheet displayed on the primary screen or (ii) the link to other objects associated with the object from the spreadsheet displayed on the primary screen available on the right virtual screen; and receiving an indication of a gesture on:

the actionable portion of the left virtual screen overlaid on the primary screen and shift the left virtual screen in place of the primary screen; or the actionable portion of the right virtual screen overlaid on the primary screen and shift the right virtual screen in place of the primary screen.

12. The method of claim 11, further comprising:

receiving an indication of an activation of the interaction control;

performing a selection of object attributes associated with the interaction control, wherein the object attributes are associated with data elements of the object; and detecting a creation of a pivot table, wherein the pivot table includes the selected object attributes and the data elements of the object.

13. The method of claim 11, further comprising:
receiving an indication of an activation of the interaction control;
performing an attribute relationship analysis of data elements of the object based on the interaction control; and
detecting a creation of a pivot table, wherein the pivot table includes results from the attribute relationship analysis and data elements of the object.

14. The method of claim 11, further comprising:
receiving an indication of an activation of the link to other objects on the right virtual screen or on the left virtual screen; and
causing presentation of a chart of the object on the other one of the right virtual screen or the left virtual screen.

15. The method of claim 11, further comprising:
receiving an indication of a swipe concluding at a left edge of the primary screen;
shifting (i) the interaction control or (ii) the link to other objects from the right virtual screen to the primary screen; and
shifting the object into the left virtual screen.

16. The method of claim 11, further comprising:
receiving an indication of a tap action on an area of the primary screen displaying the left portion of the right virtual screen;
shifting (i) the interaction control or (ii) the link to other objects from the right virtual screen to the primary screen; and
shifting the object into the left virtual screen.

17. The method of claim 11, further comprising:
receiving an indication of an activation of the link to other objects on the right virtual screen or on the left virtual screen; and
causing presentation of a pivot table that includes data elements of the object on the other one of the right virtual screen or the left virtual screen.

18. A computer-readable storage media with instructions stored thereon for managing objects in a display to navigate a spreadsheet, the instructions comprising:
displaying an object from the spreadsheet on a primary screen of the display, wherein the display includes the primary screen, a left virtual screen, and a right virtual screen;
providing, on the left virtual screen, at least one of (i) an interaction control determined according to the object from the spreadsheet displayed on the primary screen or (ii) a link to other objects, the other objects comprising data tables, alternative charts, or pivot tables;
providing, on the right virtual screen, at least the other one of the (i) interaction control determined according to the object from the spreadsheet displayed on the primary screen or (ii) the link to other objects, the other objects comprising data tables, alternative charts, or pivot tables;
overlaying an actionable portion of the left virtual screen on a left edge of the primary screen, the actionable portion of the left virtual screen having content overlaid on the primary screen, wherein the actionable portion of the left virtual screen exposes a right portion of the left virtual screen with an indication of (i) the interaction control determined according to the object from the spreadsheet displayed on the primary screen or (ii) the link to other objects available on the left virtual screen;
overlaying an actionable portion of the right virtual screen on a right edge of the primary screen, the actionable portion of the right virtual screen having content overlaid on the primary screen, wherein the actionable portion of the left virtual screen exposes a left portion of the right virtual screen with an indication of (i) the interaction control determined according to the object from the spreadsheet displayed on the primary screen or (ii) the link to other objects available on the right virtual screen;
detecting a gesture on the actionable portion of the left virtual screen overlaid on the primary screen or on the actionable portion of the right virtual screen overlaid on the primary screen;
responsive to detecting the gesture on the actionable portion of the left virtual screen, shifting the left virtual screen in place of the primary screen; and
responsive to detecting the gesture on the actionable portion of the right virtual screen, shifting the right virtual screen in place of the primary screen.

19. The computer-readable storage media of claim 18, wherein the instructions further comprise:
detecting a touch action on an element of the object;
activating a primary interaction control on the primary screen associated with the touch action, wherein the primary interaction control includes one or more of a select control, a sort control, a filter control, a zoom in control, or a zoom out control performed on the element of the object;
detecting an activation of the primary interaction control to perform actions associated with the primary interaction control on the element of the object;
detecting an activation of the interaction control; and
performing actions on a format of the object through the interaction control.

20. The computer-readable storage media of claim 18, wherein the instructions further comprise:
detecting a change in an orientation of the primary screen through device sensors;
modifying the orientation of the spreadsheet to match the detected orientation change of the primary screen;
rotating an object displayed on the primary screen to match the detected orientation change of the primary screen; and
re-scaling the object displayed on the primary screen by swapping axes in a chart, adding columns to a data table of the object, adding rows to the data table of the object, removing columns from the data table of the object.

* * * * *